(12) United States Patent
Korsgaard Jensen et al.

(10) Patent No.: US 10,732,287 B2
(45) Date of Patent: Aug. 4, 2020

(54) LIDAR BASED ON MEMS

(71) Applicant: Windar Photonics A/S, Taastrup (DK)

(72) Inventors: Jørgen Korsgaard Jensen, London (GB); Peter John Rodrigo, Roskilde (DK); Christian Pedersen, Hvidovre (DK); Qi Hu, Virum (DK)

(73) Assignee: Windar Photonics A/S, Taastrup (DK)

( * ) Notice: Subject to any disclaimer, the term of this patent is extended or adjusted under 35 U.S.C. 154(b) by 409 days.

(21) Appl. No.: 15/537,610

(22) PCT Filed: Dec. 21, 2015

(86) PCT No.: PCT/EP2015/080798
§ 371 (c)(1),
(2) Date: Jun. 19, 2017

(87) PCT Pub. No.: WO2016/097409
PCT Pub. Date: Jun. 23, 2016

(65) Prior Publication Data
US 2019/0041524 A1    Feb. 7, 2019

(30) Foreign Application Priority Data

Dec. 19, 2014   (EP) .................................. 14199178

(51) Int. Cl.
*G01S 17/95*       (2006.01)
*G01S 17/58*       (2006.01)
*G01S 7/481*       (2006.01)
*G02B 26/08*       (2006.01)

(52) U.S. Cl.
CPC ............ *G01S 17/95* (2013.01); *G01S 7/4812* (2013.01); *G01S 7/4817* (2013.01); *G01S 17/58* (2013.01); *G02B 26/0833* (2013.01); *Y02A 90/19* (2018.01)

(58) Field of Classification Search
CPC ............. G01C 3/08; G01J 11/00; G01B 11/00
See application file for complete search history.

(56) References Cited

U.S. PATENT DOCUMENTS

| | | | |
|---|---|---|---|
| 2005/0002013 A1* | 1/2005 | Harris | ...................... G01P 5/26 356/4.1 |
| 2006/0132752 A1 | 6/2006 | Kane | |
| 2012/0120382 A1* | 5/2012 | Silny | ..................... G01S 7/4818 356/4.01 |

FOREIGN PATENT DOCUMENTS

| | | |
|---|---|---|
| DE | 10162009 A1 | 7/2003 |
| EP | 2453253 A1 | 5/2012 |
| JP | 2012 058695 A | 3/2012 |

OTHER PUBLICATIONS

Machine translation of abstract, description, and claims of DE10162009A1.
Machine translation of abstract, description, and claims of JP2012058695A.

* cited by examiner

Primary Examiner — Luke D Ratcliffe
(74) Attorney, Agent, or Firm — Dinsmore & Shohl LLP

(57) ABSTRACT

A system for measuring velocity of particles such as particles in air is a Light Detection and Ranging (LIDAR) system, having a micro-electro-mechanical-system (MEMS).

20 Claims, 6 Drawing Sheets

LIDAR BASED ON MEMS

FIELD OF INVENTION

The present invention relates to a system for measuring velocity of particles such as particles in air. The present invention relates in particular to a Light Detection and Ranging (LIDAR) system, having a micro-electro-mechanical-system (MEMS).

BACKGROUND OF INVENTION

It is well-known that LIDAR can be used for measuring a velocity of a particle. Typically, a single beam-focusing optical unit, such as a telescope, is used for measuring the velocity. The single telescope is typically both used as a transmitter and a receiver of light, the light typically being a laser beam. First, light is transmitted to a target via the telescope, secondly, light is scattered at the target, and finally, backscattered light is received via the telescope, such that a velocity component can be determined.

A LIDAR system having a single telescope is limited to line of sight measurement, prohibiting the determination of, for example, a wind field having multiple velocity components. One solution to determine multiple velocity components, i.e. a plurality of velocity vectors, is to implement a scanning unit in the telescope, such that a wider field of view can be obtained. Another solution is to use multiple telescopes, and for example measuring wind speed components simultaneously, for example by splitting up a single light beam. The drawback of the latter solution implies a drop of transmitted optical power. Thus, it has been suggested to switch a single light beam between a plurality of beam-focusing optical units, in particular such that the beam-focusing optical units are pointed at the same probe volume, such that different views of the same target volume is provided.

In order to switch the light beam between a plurality of beam-focusing optical units, it has specifically been proposed to use fibre optics, such that the beam is switched and coupled into the beam-focusing optical units with little loss in optical power. Using fibre optics provides first of all a fixed configuration of the light and a specific transmission into for example the plurality of beam-focusing optical units. In this regard, a fibre optic solution is a very stable system. On the other hand, such a solution is also very sensitive to the configuration, or rather the alignment, of the beam-focusing optical units. For example, in assembly of LIDAR systems, the beam-focusing optical units can easily be misaligned, and the fibre optics may then be adjusted to adapt to the misalignment of the beam-focusing optical units. Alternatively, the beam-focusing optical units may be adjusted to the optical fibre, or a combination of the two methods, may provide an overall aligned LIDAR system. Such an alignment is cumbersome and time demanding. Further, if the LIDAR system is installed, for example on top of a wind turbine, it may not be easy to align either the fibre optics or the beam-focusing optical units, and there is therefore a need for a LIDAR system that provides easy and simple alignment of the beam.

SUMMARY OF INVENTION

In order to solve and address the above mentioned problems and issues, the present disclosure provides a LIDAR system comprising: a beam-generating section adapted for generating an output beam; a plurality of beam-focusing optical units, each having at least one optical element, the optical element defining an optical axis; and a beam-steering element in optical connection with the beam generating section, and comprising a micro-electro-mechanical-system (MEMS) comprising at least one reflecting element adapted to be arranged in a plurality of positions, the beam-steering element configured such that the output beam can be directed interchangeably between the at least one optical element for each of the beam-focusing optical units by selectively positioning the reflecting element(s), and wherein the selected positions of the reflecting element(s) are selected such that the output beam is aligned with the optical axes for the at least one optical element in the beam-focusing optical units.

By the invention as hereby disclosed, it may be possible to easily align the output beam to the optical axis of the beam-focusing optical units, for example by simply changing the selected positions of the reflecting element(s). The selected positions could be based on a desired design, such as a theoretical design, or a proto-type design. Alternatively, the selected positions could be based on a performance parameter of the system as assembled. It should be noted, that by aligning the output beam with the optical axis for the at least one optical element in beam-focusing optical units, it is to be understood, that this is within the precision of for example the MEMS and the determination of the optical axis. Thus, in practice, the alignment with the optical axis is within a certain degree of precision, such that the output beam deviates from the optical axis by such as less than 5 degrees, such as less than 4 degrees, such as less than 3 degrees, such as less than 2 degrees, preferably less than 1 degree and/or more preferably less than 0.1 degrees.

However, variations of the optical axis from a desired design, known as misalignment, can easily occur, for example during assembly or installation of the beam-focusing optical units. Misalignment may however also occur due to environmental conditions, such as temperature variations, thereby shrinking or expanding the optical elements or other materials, for example holding the optical elements, in the beam-focusing optical units.

Thus, by the present invention, it may be possible to adapt to the misalignment of the beam-focusing optical units, simply by changing the selected positions of the reflecting element(s). In contrast to typical alignment, the present invention provides alignment, where at least mechanical alignment of the beam-focusing optical units may be avoided. Mechanical alignment may be nice to avoid, especially when the LIDAR system is placed on top of a wind turbine, where it is difficult to perform mechanically alignment. Even if the beam-focusing optical units could be uninstalled from the top of the wind-turbine and be mechanically aligned at ground, there would still be a risk of misaligning the beam-focusing optical units when the LIDAR system is being installed again on top of the wind-turbine. Thus, the present invention provides a LIDAR system that can be aligned with low risk, for example by changing the selected positions remotely from the LIDAR system.

The present invention further provides a LIDAR system, where a fiber not necessarily is coupled into the beam-focusing optical units, because the MEMS may be able to direct the output beam directly into the beam-focusing optical units. In this way, it may be possible to provide an even simpler alignment of the beam-focusing optical units, in that a fiber is not required to be aligned with the beam-focusing optical units. On the other hand, the only thing that needs to be achieved is to determine the position of the selected positions of the reflecting element(s) of the MEMS, such that the output beam is able to be transmitted and received optimally through the beam-focusing optical units.

By having a MEMS in the LIDAR system as described, several other effects are achieved. First of all, a MEMS with reflection element(s) is able to switch rapidly between positions. In this way, the present invention may be similar to a LIDAR system with a plurality of beam-focusing optical units transmitting and receiving simultaneously. However, the present invention may be better than such a LIDAR system, because there may be very little optical loss since the beam is not split, but also because there may be low insertion loss in the reflecting element(s) in comparison Secondly, since a MEMS as described is with reflection element(s), there is provided a beam-steering element which may be insensitive to wavelength variations, for example, if the reflection element is properly coated. Wavelength variation may for example occur over a long time period, such as during months or even years, for example if the light source detunes over time. Thus, the present invention provides a LIDAR system that provides efficient, accurate and stable precision alignment. Thirdly, reflection element(s) within a MEMS may be insensitive to environmental factors, for example weather conditions, such as humidity or temperature. As a result, the present invention may provide a LIDAR system that works without degradation, thereby extending the lifetime of the system. Fourthly, a MEMS may be insensitive to polarization. Thus, the present invention provides a LIDAR system that requires no control of polarization, thereby providing a LIDAR stem which is simple to manufacture. Further, reflecting element(s) within the MEMS may provide a LIDAR system that gives the advantage of providing the ability to tune the focusing distance.

The LIDAR system as disclosed herein may be a coherent Doppler LIDAR system. In such a system, the system transmits a light beam and receives a part of backscattered light from a target, such that the backscattered light is coherently superpositioned with a reference beam generated by a local oscillator. Thus the LIDAR system may comprise a local oscillator. The local oscillator may be comprised of generating optics, such as a reference wedge, for example responsible for generating a reflected signal. Accordingly, the backscattered light may be received with the reference beam on a detector, from where the line-of-sight or radial speed of the target may be deduced. Thus, the backscattered light may be a Doppler-shifted target signal and an unshifted reference signal, i.e. the detector may receive a Doppler spectrum from which an analysis, such as a frequency analysis, can be performed, for example in a signal processor. By having the plurality of beam-focusing optical units, it may be possible to resolve a plurality of velocity vectors for the target and/or for several targets.

A coherent Doppler LIDAR system is subject to phase induced intensity noise (PIIN) due to phase noise of the local oscillator that is converted to intensity noise through the beating of the backscattered light from the target. The PIIN is at least dependent on the power of the signal coming from the local oscillator, the power of residual light, the coherence time of the beam-generating section, and the delay time between the local oscillator and the backscattered light. Due to the delay time between the local oscillator and the backscattered light, the PIIN is dependent on the configuration of the optical path from the target to the local oscillator, thus the configuration of the LIDAR system. Specifically, the PIIN increases with the squared delay time between the local oscillator and the backscattered light, thus the PIIN increases with the squared optical path from the target to the local oscillator. In other words, the PIIN is very sensitive to the optical path, which therefore optimally should be shortened as much as possible to decrease the PIIN.

Implementation of a MEMS in a LIDAR system as disclosed herein, may however have the effect of increasing the PIIN, due to an increased optical path in comparison to other LIDAR systems. However, the advantages as described by the other effects provide a LIDAR system that is of great advantage in measuring velocity of particles.

DETAILED DESCRIPTION OF THE INVENTION

Figure 1:
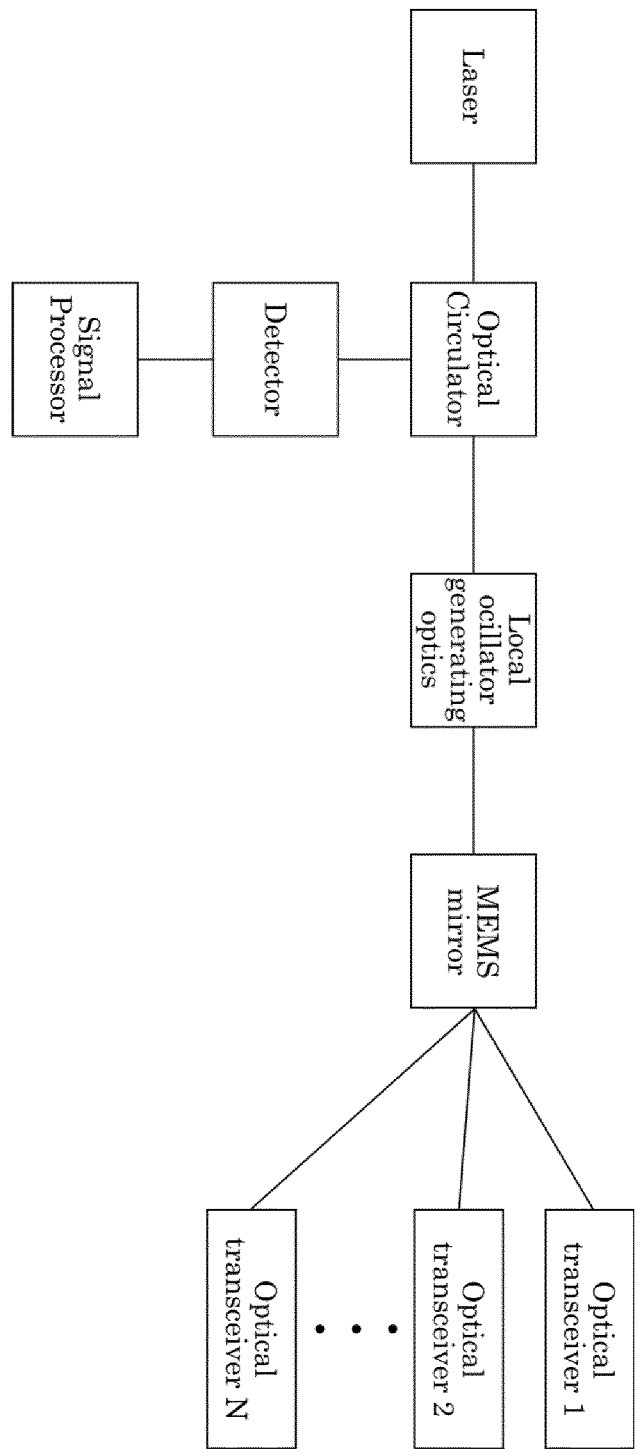
FIG. 1 shows an embodiment of a LIDAR system according to the present invention.

In a preferred embodiment of the present invention, there is provided A LIDAR system, comprising: a beam-generating section adapted for generating an output beam; a plurality of beam-focusing optical units, each having at least one optical element, the optical elements defining one or more optical axes; and a beam-steering element in optical connection with the beam generating section and comprising a micro-electro-mechanical-system (MEMS) comprising at least one reflecting element adapted to be arranged in a plurality of positions, the beam-steering element is located on at least one of the optical axes for the at least one optical element in the beam-focusing optical units and configured such that the output beam from the at least one reflecting element can be directed interchangeably between the at least one optical element for each of the beam-focusing optical units by selectively positioning the reflecting element(s), and wherein the selected positions of the reflecting element(s) are selected such that the output beam being directed is aligned with at least one of the optical axes for the at least one optical element in the beam-focusing optical units.

In another preferred embodiment of the present invention, there is provided a LIDAR system, comprising: a beam-generating section adapted for generating an output beam; a plurality of beam-focusing optical units, each having at least two optical elements, the at least two optical elements defining one or more optical axes; and a beam-steering element in optical connection with the beam generating section and comprising a micro-electro-mechanical-system (MEMS) comprising at least one reflecting element adapted to be arranged in a plurality of positions, the beam-steering element is located on at least one of the optical axes for the at least two optical elements in the beam-focusing optical units and configured such that the output beam from the at least one reflecting element can be directed interchangeably between at least one optical element of the at least two optical elements for each of the beam-focusing optical units by selectively positioning the reflecting element(s), and wherein the selected positions of the reflecting element(s) are selected such that the output beam being directed is aligned with at least one of the optical axes for the at least two optical elements in the beam-focusing optical units.

By having the beam-steering element located on at least one of the optical axes for the at least one optical elements in the beam-focusing optical units, the output beam can be aligned directly to one of the optical axes of the beam-focusing units. Thus, if one of the at least one optical elements, defining one or more optical axis, gets misaligned, thereby forming a new optical axis, the output beam can be aligned directly to the new optical axis, in particular by selectively positioning the reflecting element(s). Misalignment may for example occur due to mechanical movement of at least one optical element. The at least one optical element may for example be lens elements, or reflecting elements, such as plane or curved mirrors.

Most preferably, the output beam may be transmitted in free space towards at least one optical element of the at least two optical elements for each of the beam-focusing optical units. When transmitted in free-space, it follows that the beam-steering element may be located on at least one of the optical axes for the at least two optical elements in the beam-focusing optical units.

In most preferred embodiments, when aligned, the at least one reflecting element may comprise a reflective plane. In such embodiments, it may then follow that a normal to the reflective plane is angled relative to the output beam being incident on the reflective plane and angled relative to the at least one of the optical axes for the at least two optical elements in the beam-focusing optical units.

Measurement Targets and Volumes

As previously described, the present disclosure relates to measuring velocities of a target. Accordingly, the system may be configured for measuring a velocity of a solid and/or a diffuse target such as aerosols like dusts, pollen grains, water droplets, and molecules. The aerosols may be within different target volumes such that a plurality of velocity vectors for several targets may be measured.

In a preferred embodiment of the present invention, the system is configured such that said beam-focusing optical units are focused at different target volumes. The target volumes may have a diameter smaller than 1 m, such as smaller than 0.5 m, and a radial extent smaller than 100 m, such as smaller than 25 m. In order to focus at different target volumes, there may be an angular deviation between the plurality of beam-focusing optical units. For example, the optical axes of two or more beam-focusing optical units may be angled by a yaw angle of between 5 to 60 degrees, such as between 20 to 60 degrees. For the latter case, and if each beam-focusing optical unit is focused at 100 meters, the target volumes may then be separated laterally by about 35 to 100 meters. In addition to the yaw angle, the two or more beam-focusing optical units may also be angled by an elevation angle of between 0 to +/−30 degrees.

As also previously described, the system may be a coherent Doppler LIDAR system. In relation hereto, the system may be based on optical heterodyne detection. Accordingly, the beam-focusing optical units may be configured for receiving optical signals.

Optical System

In one embodiment, the system further comprising an optical circulator comprising at least 2 ports configured to be in optical connection with at least the beam-generating section and the beam-steering element. Thus, a first port is connected to the beam generating section, and a second port is where the beam is transmitted from and further into the MEMS. Prior the MEMS, the beam may have passed through a local oscillator generating optics, such as a reference wedge, when setup as a coherent LIDAR Doppler LIDAR. Preferably, the optical circulator comprises 3 ports, such that a third port is in optical connection with a detector. Thus, port 3 may be where the Doppler-shifted target signal and the reference signal is transmitted to the detectors.

The optical connection as described above may be provided by a fiber, preferably a standard single mode fiber. For example, there may be a fiber between the beam-generating section and into the first port of the optical circulator. There may also be a fiber from the second port of the optical circulator that couples the output beam out of the fiber and into the MEMS, and as previously described, preferably prior to the MEMS, also into a local oscillator generating optics. The fiber from the second port partly specify the delay time between the local oscillator and the backscattered light, and may thus be selected with a length in order to decrease the PIIN. From the MEMS, the beam is able to be directed into the plurality of beam-focusing optical units, such that the beam is able to be aligned along the optical axis for each of the beam-focusing optical units. Further, there may also be a fiber from the third port of the optical circulator into the detector. As just described, the LIDAR system as here disclosed may be a partly free-space optical system. The free-space part may increase the optical path in the LIDAR system such that the PIIN may be increased accordingly. On the other hand, the free-space part is also allowing the MEMS to be implemented in the LIDAR system, such that the output beam is able to be aligned along the optical axis for each of the beam-focusing optical units. An additional effect of having the MEMS is that it provides the possibility of using a standard single mode fiber, which typically are low cost. By the present invention, is thus provided a low cost LIDAR system, especially in comparison to a LIDAR system, where for example a polarization maintaining single mode fiber is required. A polarization maintaining single mode fiber is for example required such as in a polarization controlled LIDAR system, where the output beam may also be split into signals with different polarizations.

In one embodiment of the present invention, the beam-generating section is a wavelength tunable laser. The wavelength tunable laser may be able to change the focus distance for each of the beam-focusing optical units, thereby providing a flexible LIDAR system. The tunable laser may be configured to be tuned in a range of +/−100 nm, such as +/−50 nm, such as +/−10 nm, and/or such as +/−5 nm.

In a preferred embodiment of the present invention, the beam-generating section is an all-semiconductor light source. The all-semiconductor light source may for example be a master oscillator power amplifier (MOPA) semiconductor laser, such as a monolithic-integrated MOPA semiconductor laser, for example emitting a wavelength of around 1550 nm. As previously described, the PIIN depends on the coherence time of the beam generating section, and by using an all-semiconductor MOPA laser, the coherence time may provide a relatively large amount of PIIN in comparison to using other laser light sources. Using an all-semiconductor MOPA laser in combination with a MEMS that also may provide a relatively large PIIN, may thus provide an overall large PIIN. Thus, such a combination may be seen as an important trade-off. On the other hand, an effect of having an all-semiconductor laser may be that it offers an inexpensive and compact solution of the beam generating section. In particular, an all-semiconductor MOPA laser also provides a LIDAR system with low or no spurious reflections. Further, an all-semiconductor is very stable and may therefore be of great advantage in a LIDAR system, where stability is very important, in particular when used on top of a wind turbine.

Output Beam

In one embodiment of the present invention, the output beam is a continuous-wave laser beam. In another embodiment of the present invention, the output beam is a pulsed wave laser beam.

In a preferred embodiment of the present invention, the output beam from each of said beam-focusing optical units is focused at a focus distance between 1-1000 meters. The focus distance may in other preferred embodiments be smaller than 1 meter, such as smaller than 0.5 m, such as smaller than 0.25 m, and/or such as smaller than 0.1 m. and/or ranging up to a focus distance of 1000 meters.

The output beam from each of said beam-focusing optical units may be focused by wavelength tuning means, for example by a wavelength tunable laser.

Beam-Focusing Optical Units and Their Optical Axis

In a preferred embodiment of the present invention, the plurality of beam-focusing optical units is three beam focusing optical units, which allow for determining three velocity vectors. In another preferred embodiment of the present invention, the plurality of beam-focusing optical units is four or five beam-focusing optical units, which allow for determining four or five velocity vectors. An effect of having four or five beam-focusing optical units may be that they may provide a better accuracy than three beam-focusing optical units in relation to measuring the velocity of a particle.

In a preferred embodiment of the present invention, the optical axis, such as for at least one optical element, is defined as the line connecting the center points of the center of curvature of each optical surface. In other words, the optical axis is a hypothetical center line connecting the center of curvature of each optical surface. The optical axis may be a straight line, especially when there is only a single optical element.

However, the optical axis may also be defined by two or more optical elements, following the same definition as for at least one optical element. In this regard, the optical axis, defined by two or more optical elements may be a straight line, but the optical axis may also be or a line that is being redirected, thereby forming a broken optical axis.

When the output beam is being aligned to the optical axis, using the selected positions of the reflecting element(s) according to the present invention, the selected positions are preferably selected prior to the LIDAR system being installed, such that the alignment is only required to be done once. However, as described, the optical axis may change due to various reasons, and in an alternative embodiment of the present invention, the selected positions are selected after the LIDAR system is being installed.

The selected positions may for example be selected such that the positions are based on a measurement of for example the transmitted and/or the received signal. The LIDAR system may thus comprise an active feedback system or rather an active alignment system, providing measurement input to the MEMS in order to control the positions of the reflecting element(s).

MEMS

In one embodiment of the present invention, the selected positions are positioned to an accuracy of less than 500 micro degrees, at least at room temperature. In other words, the selected positions can be repositioned very accurately due to the positional repeatability of the MEMS being less than 500 micro degrees. Thus, the MEMS provides a LIDAR system, where alignment of the output beam along the optical axis of each of the beam-focusing optical units is very accurate and very stable.

In a preferred embodiment of the present invention, the selected positions are angular positions between −25 degrees to +25 degrees, such as between −10 degrees to +10 degrees, such as between −9 degrees to +9 degrees, such as between −8 degrees to +8 degrees, such as between −7 degrees to +7 degrees, such as between −6 degrees to +6 degrees such as between −5 degrees to +5 degrees. The reflecting element(s) may be able to be tilted in two directions, meaning that the angular positions may be along two directions, for example x-directions and y-directions.

Further, the MEMS may be configured to direct the output beam from one to another beam-focusing optical unit in less than 500 ms, such as less than 400 ms, such as less than 300 ms, such as less than 200 ms, such as less than 100 ms, such as less than 50 ms, such as less than 40 ms, such as less than 30 ms, such as less than 20 ms, and/or such as less than 10 ms. In this way, the MEMS may provide a LIDAR system with rapidly shifting the measuring direction.

Preferably, the reflecting element may be a mirror, i.e. the MEMS may comprise at least one MEMS mirror.

The MEMS may be with a mirror, such as a bonded mirror with a diameter of less than 10 mm, such as less than 9 mm, such as less than 8 mm, such as less than 7 mm, such as less than 6 mm, such as less than 5 mm, such as less than 4 mm, such as less than 3 mm, such as less than 2 mm and/or such as less than 1. In other embodiments, the mirror may be larger than 10.

More preferably, the reflecting element may be configured with a reflectivity being tolerant to wavelength tuning. In this way, wavelength tuning may be implemented in the LIDAR system, such that the focus of the beam-focusing optical units can be changed optimally due to wavelength tuning.

Other Beam Steering Elements

In a preferred embodiment of the present invention, the beam steering element comprises one or more beam redirecting structure(s) such that said positioning of the reflecting element(s) is reduced. For example, by having up to four more beam redirecting structure(s), such as stationary mirrors, it may be possible to change the positions of the reflecting element in angular positions of less than 5 degrees, such that the output beam is changed in a direction of more than 20 degrees, in particular such that it output beam can be directed into the beam-focusing optical units having their optical axis angled more than 20 degrees from each other. Further, by this manner, it may be possible to provide a LIDAR system with very rapidly shifting the measuring direction.

In one embedment of the present invention, the beam steering element comprises one or more liquid crystal(s) such that a polarization of said output beam can be controlled. In one example of this embodiment, a liquid crystal device may be placed in front of the MEMS to control the polarization state of the light directed by the reflecting element(s). Such an embodiment may be useful if some measurements require that the output beam to be with specific or tunable polarization states. In another example of this embodiment, a liquid crystal may be placed in front of each of the telescopes. The reflecting element may switch the beam along the optical of one of the beam-focusing optical units, and the liquid crystal may then switch the polarization between two orthogonal linear states. In this way, there may be provided two output beams for each telescope, thus providing the possibility for determining more velocity vectors of one or more targets.

Optical Connection Between the Beam Generating Section and the MEMS

In one embodiment of the present invention, the optical connection between the beam generating section and the MEMS is by an output beam that diverges towards the at least one reflecting element, such that when aligned with at least one of the optical axes for the at least one optical element in the beam-focusing optical units, the directed output beam is diverging towards the at least one optical element. Most preferably, the directed beam is diverging towards the at least one optical element in free-space. Thereby is facilitated that the alignment to the optical axis is independent on other propagating elements. Alignment to at least one of the optical axes can thereby be made in a simple manner. In some embodiments, the output beam that diverges towards the at least one reflecting element is directly propagating from an optical fiber.

In another embodiment of the present invention, the optical connection between the beam generating section and the MEMS is by an output beam that converges towards the at least one reflecting element, such that when aligned with at least one of the optical axes for the at least one optical element in the beam-focusing optical units, the directed output beam is converging towards the at least one optical element. Most preferably, the directed beam is converging towards the at least one optical element in free-space. Thereby is facilitated that the alignment to the optical axis is independent on other propagating elements. Alignment to at least one of the optical axes can thereby be made in a simple manner.

In a third embodiment of the present invention, the optical connection between the beam generating section and the MEMS is by an output beam that is collimated towards the at least one reflecting element, such that when aligned with at least one of the optical axes for the at least one optical element in the beam-focusing optical units, the directed output beam is collimated towards the at least one optical element. Most preferably, the collimated beam is converging towards the at least one optical element in free-space. Thereby is facilitated that the alignment to the optical axis is independent on other propagating elements. Alignment to at least one of the optical axes can thereby be made in a simple manner.

Example 1

A Generalized LIDAR System

FIG. 1 shows an embodiment of the LIDAR system according to the present invention. A laser is optically connected to an optical circulator via a first port. The circulator comprises three ports, and a second port is optically connected to the local oscillator generating optics. The local oscillator generating optics is further optically coupled to a MEMS mirror, which is configured such that it is able to direct light coming from the laser, through the optical circulator, through the local oscillator generating optics, into one of the plurality of beam-focusing optical units, here denoted as optical transceivers. The optical transceivers are configured for receiving backscattered light from a target, such that the backscattered light is able to be directed back into the MEMS mirrors, through the local oscillator generating optics, from which there is a reflected reference beam, which is superpositioned with the backscattered light, into the optical circulator, out of port 3, into the detector, where a signal processor is processing the spectrum of the signals.

Example 2

Figure 2:
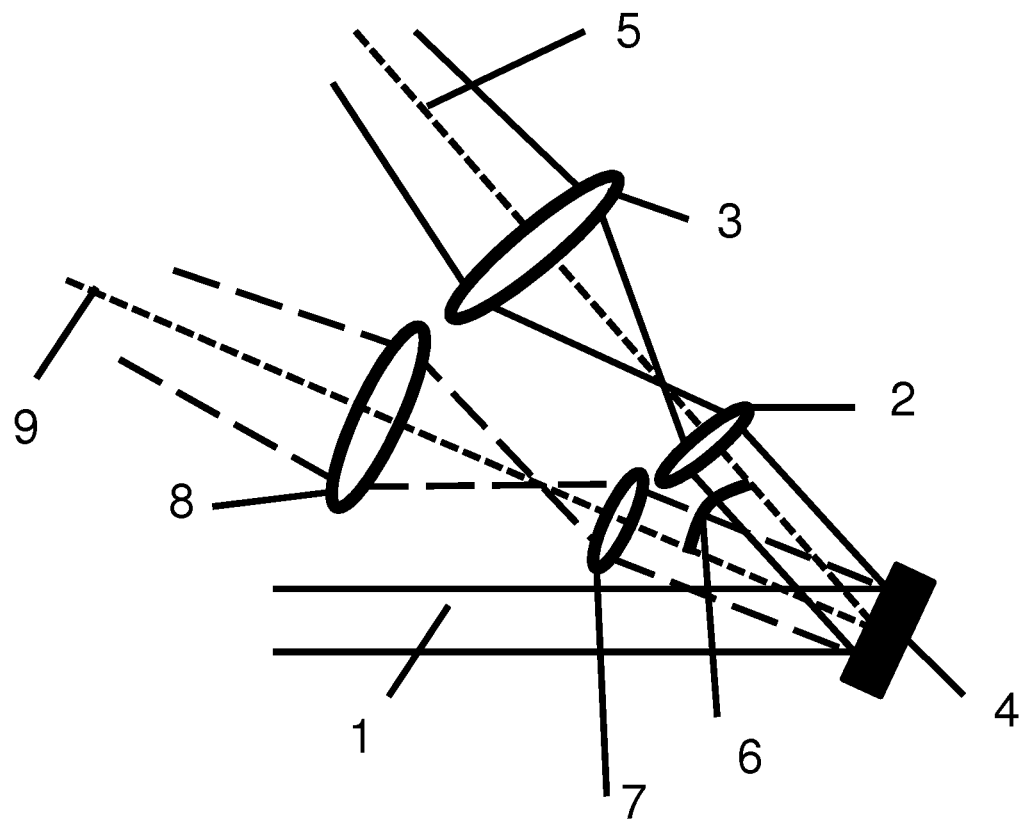
FIG. 2 shows an embodiment of a LIDAR system according to the present invention.

A LIDAR System Showing Two Beam-Focusing Optical Units with Optical Elements on a Straight Optical Axis FIG. 2 shows an embodiment of the LIDAR system according to the present invention. An output beam 1 is propagating from a beam-generating section (not shown in this figure) towards a MEMS 4, having a reflective element, such that the output beam is redirected between two beam focusing optical units, in this example having two optical elements, in this example a first lens 2 and a second lens 3 in the first beam-focusing optical unit, and a first lens 7 and a second lens 8 in the second beam-focusing optical unit. The MEMS 4 is configured for being tilted at an angle 6 in order to align the output beam to the optical axes for the two optical elements in the beam-focusing optical units. The first beam-focusing optical unit has an optical axis 5, which is the rotationally symmetric axis of the beam-focusing optical unit, and in this case the optical axis coincides with the mechanical axis of the beam-focusing optical unit and the probe direction in which a target has to be measured. The second beam-focusing optical unit has another optical axis 9, which is also the rotationally symmetric axis of the beam-focusing optical unit, and in this case the optical axis coincides with the mechanical axis of the beam-focusing optical unit and the probe direction in which the same target and/or another target has to be measured. It can be seen that the optical axis in this case is a straight line for each beam-focusing optical unit. As can also be seen from this example, there is a reflecting element on the MEMS that is located on the optical axis 5 and the other optical axis 9. The two optical axes are shown with dotted lines. The output beam 1, also being the measurement beam, has a beam diameter, or beam width, in this case, smaller than the aperture of the MEMS, so that the entire beam is able to be aligned.

Example 3

Figure 3:
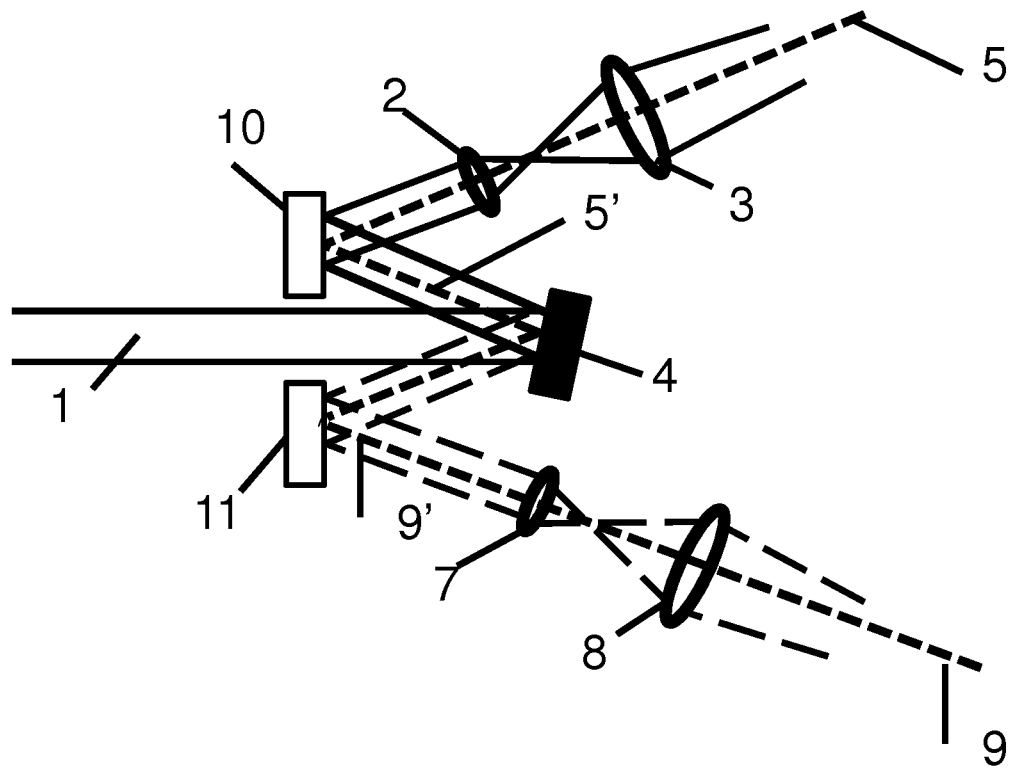
FIG. 3 shows an embodiment of a LIDAR system according to the present invention.

A LIDAR System Showing Two Beam-Focusing Optical Units with Optical Elements on a Straight Optical Axis FIG. 3 shows an embodiment of the LIDAR system according to the present invention. An output beam 1 is propagating from a beam-generating section (not shown in this figure) towards a MEMS 4, having a reflective element, such that the output beam is redirected between two beam focusing optical units, in this example having two optical elements, in this example a first lens 2 and a second lens 3 in the first beam-focusing optical unit, and a first lens 7 and a second lens 8 in the second beam-focusing optical unit. The MEMS 4 is configured for being tilted at an angle in order to align the output beam to the optical axes for the two optical elements in the beam-focusing optical units. The first beam-focusing optical unit has an optical axis 5, which is the rotationally symmetric axis of the beam-focusing optical unit, and in this case the optical axis coincides with the mechanical axis of the beam-focusing optical unit and the probe direction in which a target has to be measured. The second beam-focusing optical unit has another optical axis 9, which is also the rotationally symmetric axis of the beam-focusing optical unit, and in this case the optical axis coincides with the mechanical axis of the beam-focusing optical unit and the probe direction in which the same target and/or another target has to be measured. It can be seen that the optical axis in this case is a straight line for each beam-focusing optical unit. The output beam 1, also being the measurement beam, has a beam diameter, or beam width, in this case, smaller than the aperture of the MEMS, so that the entire beam is able to be aligned. Prior to the output beam being redirected to one of the two beam-focusing optical units, the beam is incident on a first reflective element 10 in optical communication with the first beam-focusing optical unit, and on a second reflective element 11 in optical communication with the first beam-focusing optical unit. The first reflective element and the second reflective element may be a mirror, a MEMS, gratings and/or prisms. The first and second reflective elements are in this case optical elements of the first and second beam-focusing optical units, respectively. It can be seen from the example, that the first optical axis 5 comprises two optical axes 5 and 5', since the reflecting element 10 is breaking the optical axis 5 into the two optical axes 5 and 5'. Similarly, the second optical axis 9 comprises two optical axes 9 and 9', since the second reflecting element 11 is breaking the second optical axis 9 into the two optical axes 9 and 9'. All the optical axes are shown with dotted lines. As can also be seen from this example, there is a reflecting element on the MEMS that is located on the optical axes 5 and 5' and the other optical axes 9 and 9'.

Example 4

Figure 4:
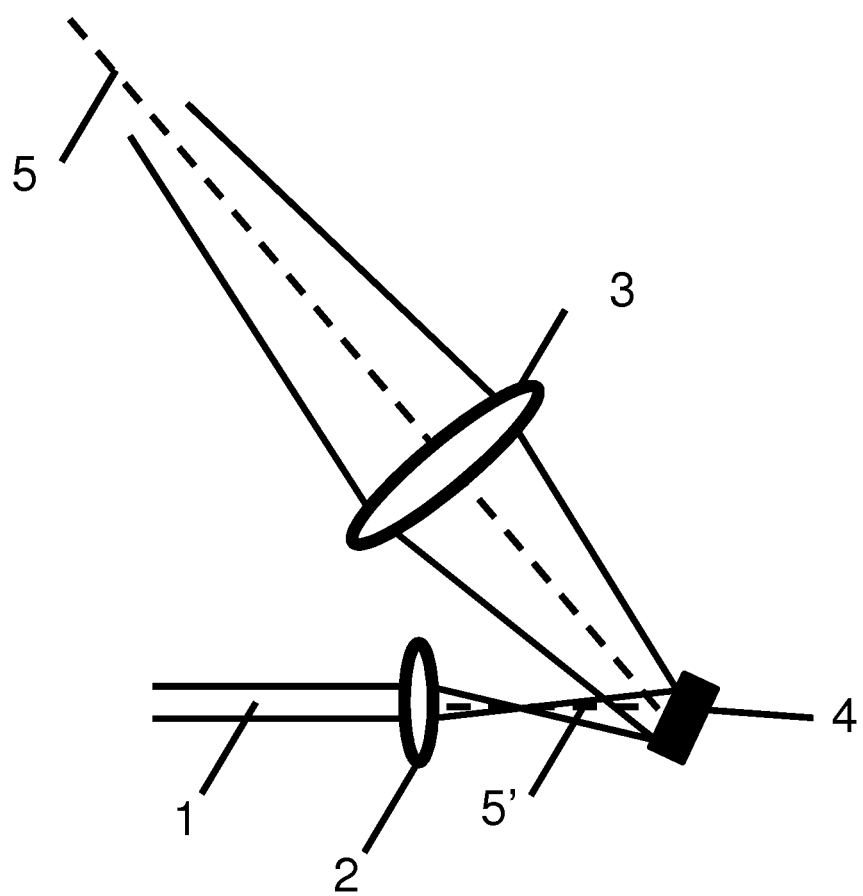
FIG. 4 shows an embodiment of a LIDAR system according to the present invention.

A LIDAR System Showing a Beam-Focusing Optical Units with Optical Elements on a Broken Optical Axis FIG. 4 shows an embodiment of the LIDAR system according to the present invention, where only a single beam focusing optical unit is shown. An output beam 1 is propagating from a beam-generating section (not shown in this figure) towards a beam focusing optical unit, in this example having two optical elements, in this example a first lens 2 and a second lens 3. The MEMS 4 is placed between the first lens and second lens, and configured for being tilted at an angle in order to align the output beam to the optical axes for one of the optical element in the beam-focusing optical units, in this case the second lens 3. The second lens 3 has an optical axis 5, which is the rotationally symmetric axis of the second lens, and in this case the optical axis coincides with the mechanical axis of the second lens and the probe direction in which a target has to be measured. An effect of having a setup like in FIG. 4, is that the first optical element 2 can be a common optical element for the plurality of beam-focusing optical units. In this way, a first optical element can be saved for the remaining beam-focusing optical units. As can further be seen from this example, the optical axis is a broken optical axis, in that it goes through the center of the first lens and the center of the second lens. Due to limited angular positioning of the MEMS 4, restrictions are imposed on the focal length and size of lens 2. It can be seen from the example, that the first optical axis 5 comprises two optical axes 5 and 5', since the reflecting element on the MEMS 4 is breaking the optical axis 5 into the two optical axes 5 and 5'. All the optical axes are shown with dotted lines. As can also be seen from this example, the reflecting element on the MEMS that is located on the optical axes 5 and 5'.

Example 5

Figure 5:
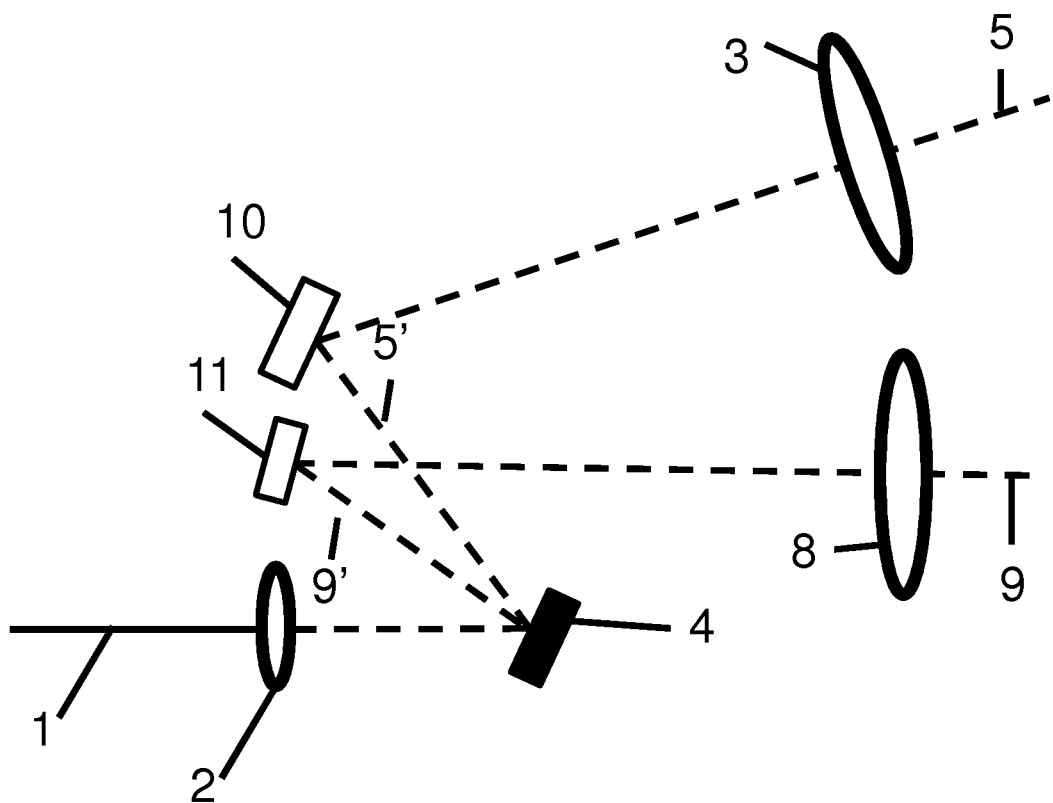
FIG. 5 shows an embodiment of a LIDAR system according to the present invention.

A LIDAR System Showing Two Beam-Focusing Optical Units with Optical Elements on a Broken Optical Axis FIG. 5 shows an embodiment of the LIDAR system according to the present invention, where two beam focusing optical units are shown. An output beam 1 is propagating from a beam-generating section (not shown in this figure) towards a beam focusing optical unit, in this example having two optical elements, in this example a first lens 2 and a second lens 3 for the first beam-focusing optical unit, and a first lens 2 and a second lens 8 for the second beam-focusing optical unit. The MEMS 4 is placed after the first lens 2, being a common optical lens elements for the two beam-focusing optical units, and the MEMS configured for being tilted at an angle in order to align the output beam to the optical axes for one of the optical element in the beam-focusing optical units, in this case the second lens 3 for the first beam-focusing optical unit and the second lens 8 for the second beam-focusing optical unit. The second lens 3 has an optical axis 5, which is the rotationally symmetric axis of the second lens, and in this case the optical axis coincides with the mechanical axis of the second lens 3 and the probe direction in which a target has to be measured. The second lens 8 has an optical axis 5, which is the rotationally symmetric axis of the second lens 8, and in this case the optical axis coincides with the mechanical axis of the second lens and the probe direction in which a target has to be measured. An effect of having a setup like in FIG. 4, is that the first optical element 2 can be a common optical element for the plurality of beam-focusing optical units. In this way, a first optical element can be saved for the remaining beam-focusing optical units. As can further be seen from this example, the optical axis is a broken optical axis, in that it goes through the center of the first lens 2 and the center of the second lenses 3, 8. Two additional reflective elements 10, 11 are included to reduce issues related to space limitations as well as for directing the measurement beam 1 in desired directions 5, 9. In this setup, the two additional elements 10, 11 can be adjusted in angular positions combined with the angular positioning of the MEMS such that the measurement beam 1 can be adjusted so that it coincide with the optical axes, respectively. In accordance with the present invention, the angular positioning of the MEMS can be used to reduce the number of mechanical adjustment, such as for example adjustment of the optical elements, such as lenses or mirrors. In this example, the two additional elements 10, 11 are shown as two separate elements, but alternatively, they could be combined into a single element, and still responsible for redirecting the beam from the MEMS into the two desired directions 5, 9. It can be seen from the example, that the first optical axis 5 comprises two optical axes 5 and 5', since the reflecting element 10 is breaking the optical axis 5 into the two optical axes 5 and 5'. Similarly, the second optical axis 9 comprises two optical axes 9 and 9', since the second reflecting element 11 is breaking the second optical axis 9 into the two optical axes 9 and 9'. All the optical axes are shown with dotted lines. As can also be seen from this example, there is a reflecting element on the MEMS that is located on the optical axes 5' and 9'.

Example 6

Figure 6:
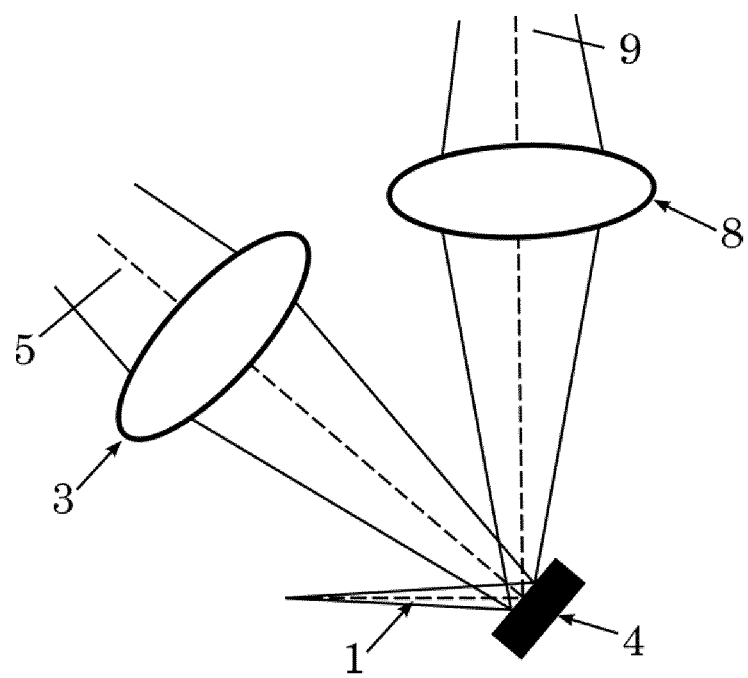
FIG. 6 shows an embodiment of a LIDAR system according to the present invention.

A LIDAR System Showing Two Beam-Focusing Optical Units with Optical Elements on a Broken Optical Axis FIG. 6 shows an embodiment of the LIDAR system according to the present invention, where there is one optical element for each of the beam focusing optical units. A divergent output beam 1 is propagating from a beam-generating section (not shown in this figure) towards a MEMS 4. The divergent output beam may originate from an optical fiber. The MEMS has a reflective element, such that the output beam is redirected between two beam focusing optical units, in this example, each beam-focusing unit have one optical element. Further, in this example, there is a lens 3 in the first beam-focusing optical unit and lens 8 in the second beam-focusing optical unit. The MEMS 4 is configured for being tilted at an angle in order to align the output beam to the optical axes for the one optical element in the beam-focusing optical units. The first beam-focusing optical unit has an optical axis 5, which is the rotationally symmetric axis of the beam-focusing optical unit, and in this case the optical axis coincides with the mechanical axis of the beam-focusing optical unit and the probe direction in which a target has to be measured. The second beam-focusing optical unit has another optical axis 9, which is also the rotationally symmetric axis of the beam-focusing optical unit, and in this case the optical axis coincides with the mechanical axis of the beam-focusing optical unit and the probe direction in which the same target and/or another target has to be measured. It can be seen that the optical axis in this case is a straight line for each beam-focusing optical unit. As can also be seen from this example, there is a reflecting element on the MEMS that is located on the optical axis 5 and the other optical axis 9. The two optical axes are shown with dotted lines. The output beam 1, also being the measurement beam, has a divergent angle. In this case, the divergent angle limits the distances between the beam-generating section (not shown in this figure) and the MEMS, so that the entire beam is able to be aligned.

The invention claimed is:

1. A LIDAR system, comprising:
    a beam-generating section adapted for generating an output beam;
    a plurality of beam-focusing optical units, each having at least one optical element, the optical elements defining one or more optical axes; and
    a beam-steering element in optical connection with the beam generating section and comprising a micro-electro-mechanical-system (MEMS) comprising at least one reflecting element adapted to be arranged in a plurality of positions;
    wherein the beam-steering element is located on at least one of the optical axes for the at least one optical element in the beam-focusing optical units and configured such that the output beam from the at least one reflecting element can be directed interchangeably between the at least one optical element for each of the beam-focusing optical units by selectively positioning the reflecting element(s), and wherein the selected positions of the reflecting element(s) are selected such that the output beam being directed is aligned with at least one of the optical axes for the at least one optical element in the beam-focusing optical units,
    wherein the system includes a misalignment condition where one of the at least one optical axes becomes misaligned, thereby forming a new optical axis, the at least one reflective element being configured to be positioned such that the output beam from the at least one reflective element propagates in free-space to the at least one optical element, whereby the at least one reflecting element is aligned directly with the new optical axis.

2. The LIDAR system according to claim 1, wherein said system is configured for measuring a velocity of a solid and/or a diffuse target.

3. The LIDAR system according to claim 1, wherein said system is configured such that said beam-focusing optical units are focused at different target volumes.

4. The LIDAR system according to claim 1, wherein said system is a coherent Doppler LIDAR system.

5. The LIDAR system according to claim 1, wherein said system further comprising an optical circulator comprising at least 2 ports configured to be in optical connection with at least said beam-generating section and said beam-steering element.

6. The LIDAR system according to claim 5, wherein said optical connection is provided by a standard single mode fiber.

7. The LIDAR system according to claim 1, wherein said beam-generating section is a wavelength tunable laser.

8. The LIDAR system according to claim 1, wherein said beam-generating section is an all-semiconductor light source.

9. The LIDAR system according to claim 1, wherein said output beam is a continuous-wave laser beam.

10. The LIDAR system according to claim 1, wherein said output beam is a pulsed wave laser beam.

11. The LIDAR system according to claim 1, wherein said output beam from each of said beam-focusing optical units is focused at a focus distance between 1-1000 meters.

12. The LIDAR system according to claim 1, wherein said output beam from each of said beam-focusing optical units is focused by wavelength tuning means.

13. The LIDAR system according to claim 1, wherein said selected positions are positioned to an accuracy of less than 500 micro degrees.

14. The LIDAR system according to claim 1, wherein said selected positions are angular positions between −25 degrees to +25 degrees.

15. The LIDAR system according to claim 1, wherein said MEMS is configured to direct the output beam from one to another beam-focusing optical unit in less than 500 ms.

16. The LIDAR system according to claim 1, wherein said reflecting element is a mirror.

17. The LIDAR system according to claim 1, wherein said reflecting element is configured with a reflectivity being tolerant to wavelength tuning.

18. The LIDAR system according to claim 1, wherein said beam steering element comprises one or more beam redirecting structure(s) such that said positioning of the reflecting element(s) is reduced.

19. The LIDAR system according to claim 1, wherein said beam steering element comprises one or more liquid crystal(s) such that a polarization of said output beam can be controlled.

20. The LIDAR system according to claim 1, wherein the optical connection between the beam generating section and the MEMS is by an output beam that is collimated towards the at least one reflecting element, such that when aligned with at least one of the optical axes for the at least one optical element in the beam-focusing optical units, the directed output beam is collimated towards the at least one optical element.

* * * * *